Patented Nov. 16, 1926.

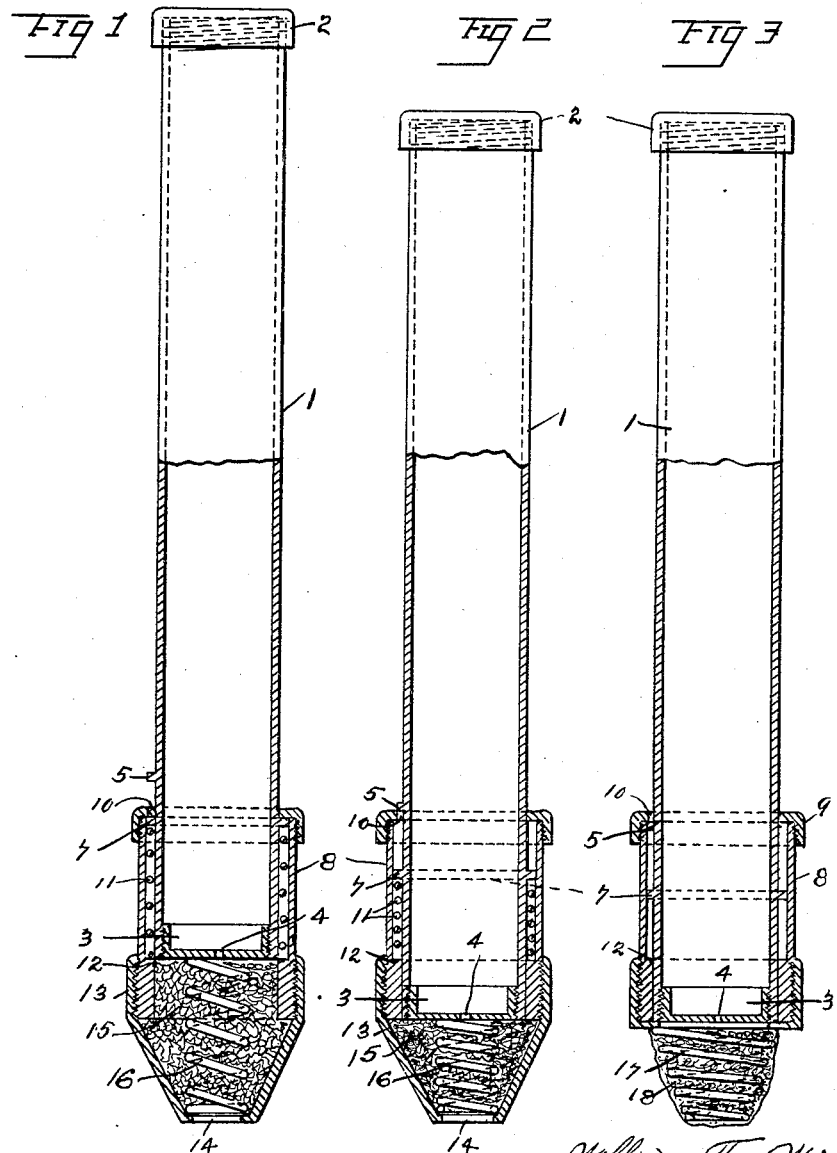

1,606,860

UNITED STATES PATENT OFFICE.

WILLIAM F. WINN, OF SALT LAKE CITY, UTAH.

WEED ELIMINATOR.

Application filed June 21, 1926. Serial No. 117,264.

This invention relates to an improvement in a weed eliminator, and has for one of its objects, to carry and distribute a weed killing liquid in small amounts upon a weed in a lawn and not to harm any of the lawn grass or allow any of the liquid to drop onto the lawn grass.

Another object of this invention is to provide a weed eliminator, whereby a weed killing liquid may be discharged therefrom by moving its handle downward.

Another object of this invention is to provide a weed eliminator, whereby a supply of weed killing liquid is carried within its handle.

Another object of this invention is to provide a weed eliminator with a sponge so arranged at its lower end that it will absorb all weed killing liquid ejected from the handle and then discharge it onto a weed when handle is moved downward.

With these and other objects in view my invention consists of certain novel features of construction as hereinafter fully described and claimed.

In the accompanying drawings forming a part of this specification and in which corresponding parts are denoted by like reference characters, is illustrated the preferred form of embodiment of the invention capable of carrying the same into practical operation, it being understood that the invention is not necessarily limited thereto, as various changes in shape, proportions and general assemblage of its parts may be resorted to without departing from the principles of the invention or sacrificing any of its advantages and the right is therefore reserved for making all the changes, and modifications which will fall within the scope of the invention and claims made therefor.

Referring to the drawings, in which;

Figure 1 is a view showing the invention partly in section to show sponge in an extended position.

Fig. 2, is a view showing the sponge in a compact position, and

Fig. 3, is a view showing a sponge and a spring without a casing.

The invention comprises a tube 1 having a removable screw cap 2 on its upper end and a removable screw plug 3 in its lower end. The plug 3 has a small opening 4 therein through which all liquid passes.

On the side of the tubing is placed a pin or lug 5, and a collar 7 is placed below said lug, A sleeve 8 is slidably placed over the lower end of the tubing and is secured thereon by a collar 9 which is threaded onto the upper end thereof. The collar 9 has a notch 10 therein. The collar 9 rests on the upper face of collar 7 thus keeping the sleeve from sliding off the tube.

Between the sleeve and the tube is placed a spring 11 the upper end thereof resting under collar 7 and the lower end thereof resting on a shoulder 12 within the sleeve. This spring keeps the sleeve in a downward position when the sponge 15 is expanded.

Secured by a thread to the lower end of the sleeve is a casing 13 which has an opening 14 in its lower end. Within the casing is a sponge 15 and a spring 16. The spring 16 works in coaction with spring 11 and at the same time it expands sponge 15 when it has been compressed as shown in Fig. 2.

In Fig. 3 the casing 13 is omitted and spring 17 has a cone taper therefor with sponge 18 therein to allow a larger discharge of liquid onto a weed. When this spring is used the spring 11 is omitted and the sleeve is locked to the tube by moving the collar 9 upward placing pin 5 through notch 10 and turning collar so that it will rest on upper face of pin.

To operate my invention; I remove the cap 2 then fill the tube with a weed killing liquid then place the cap back onto the tube and the invention is ready for operation.

The liquid within the tube will pass out of the tube through hole 4 into sponge 16 or 18. The end 14 being placed over a weed the tube 1 is moved downward thus compressing the sponge which is full of liquid, the liquid is then forced out of the sponge through the openings in the end of the spring and through hole 14 onto the weed.

When the sponge and spring shown in Fig. 3 is used the movement is the same and as the springs are expanded as shown in Figs. 1 and 3 the sponge will absorb liquid that has been drawn through opening 4 by the expansion of the springs.

Having thus described my invention what I claim as new and desire to secure by Letters Patent, is;

1. A weed eliminator comprising a tube having a removable cap on its upper end and a removable plug in its lower end, a sleeve slidably mounted on the lower end thereof having a collar to secure said sleeve on said tube, a casing secured to the lower end of said sleeve, a sponge and spring within said casing, said sponge for absorbing liquid drawn from said tube, said spring for expanding said sponge to draw the liquid out of said tube, all substantially as set forth.

2. A weed eliminator comprising a tube for holding a weed killing liquid, means for filling said tube with said liquid, means in said tube to allow said liquid to be drawn therefrom, a sleeve on the lower end of said tube, means for securing said sleeve on said tube, a casing secured to the lower end of said sleeve, a sponge within said casing for absorbing liquid that is ejected from said tube, a spring for expanding said sponge after it has been compressed over a weed to expel all liquid therein, and means for expelling all liquid within said sponge over a weed, all substantially as set forth.

3. A weed eliminator comprising a length of tubing having a removable cap on the upper end thereof and a screw plug on the lower end thereof, said screw plug having a hole therein, liquid placed within said tubing, said liquid to leave said tubing through said hole, a sleeve slidably mounted on the lower end of said tubing, means for securing said sleeve on said tubing, a casing secured to the lower end of said sleeve, a sponge and spring within said casing, said sponge to absorb the liquid that leaves said tubing through said hole, a spring surrounding said sponge for expanding said sponge after said sponge has been compressed to place some of said liquid on a weed, means for sliding said sleeve on said tubing, means for returing said sleeve to its original place after being moved out of place to compress said sponge, and means for locking said sleeve on said tubing.

4. A weed eliminator comprising a tube having a removable cap on its upper end and a screw plug in its lower end, said screw plug having a hole therein, a sleeve slidably mounted on said tube, means for locking said sleeve stationary on said tube, means for holding said sleeve slidably on said tube, a casing secured to the lower end of said sleeve, a sponge within a spring within said casing, said sponge for receiving all liquid that passes through said hole when said sponge is expanded and means for passing said liquid out of said sponge through an opening in said casing onto a weed, all substantially as set forth.

WILLIAM F. WINN.